(No Model.)
W. T. NEWPORT.
RACE TRACK LEVELING MACHINE.
No. 528,890. Patented Nov. 6, 1894.
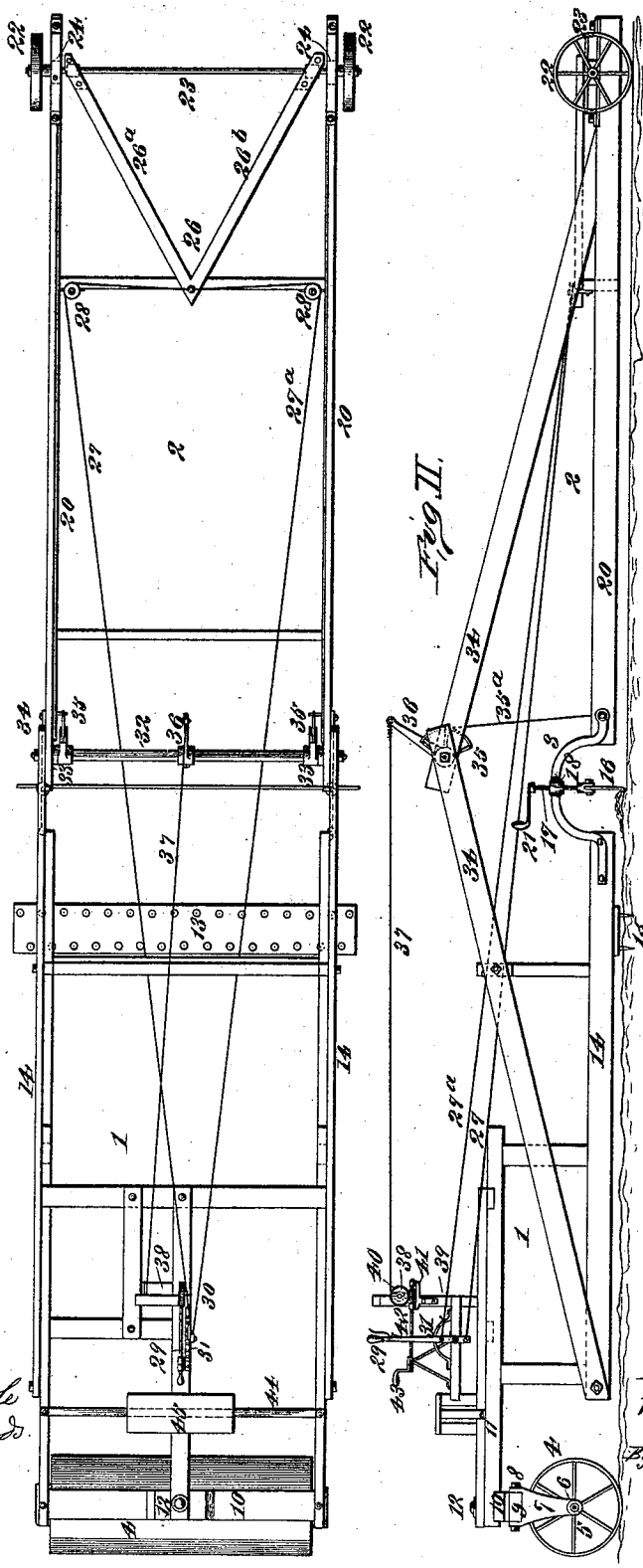
Fig. I. Fig. II.
Attest:
A. M. Ebersole
C. G. Edward
Inventor:
W. T. Newport
By Knight Bros.
atty's

UNITED STATES PATENT OFFICE.

WILLIAM T. NEWPORT, OF FARMERSVILLE, ILLINOIS.

RACE-TRACK-LEVELING MACHINE.

SPECIFICATION forming part of Letters Patent No. 528,890, dated November 6, 1894.

Application filed February 17, 1894. Serial No. 500,468. (No model.)

*To all whom it may concern:*

Be it known that I, WILLIAM T. NEWPORT, of Farmersville, in the county of Montgomery, in the State of Illinois, have invented a certain new and useful Improvement in Race-Track-Leveling Machines, of which the following is a full, clear, and exact description, reference being had to the accompanying drawings, forming part of this specification.

My invention relates to an improved leveling machine, which is well adapted for leveling the ground surface of circular tracks, and which may be used to equal advantage on straight tracks, or for general leveling purposes, where a smooth and even ground surface is desired, the object of my improvement being to produce a machine that will remove the bumps or high places from the track, and with the removed ground fill up the low places.

My invention consists in features of novelty hereinafter fully described and pointed out in the claims.

Figure I is a top or plan view of my improved machine. Fig. II is a side elevation of the same.

Referring to the drawings: 1 represents the front and 2 the rear section of the frame of the machine. The sections are adjustably connected or hinged together near the center of the machine by a U shaped yoke 3. The front end of the machine is supported by a roller 4 mounted on a shaft 5 suitably journaled in bearings 6 in the lower ends of hangers 7, the upper ends of which are secured by bolts 8 to the axle 9 to which the motive power is applied.

10 represents a bar that connects the front side rails 11 of the front frame work of the machine and 12 represents a bolt that passes through perforations in the axle 9 and bar 10 and thus forms a pivot on which the roller can be turned under the machine, thus allowing the machine to be turned in a space equal to the length of itself. The roller being at the front end prevents the machine from sinking into the loose dirt, and in this respect furnishes a better support than ordinary wheels. This feature is desirable from the fact that the front end of the machine should, at all times, when in operation, be substantially on a level so as to allow the cross-bar 13, which is secured to the side rails 14, and provided with harrow teeth 15, to be forced into contact with the ground so as to thoroughly pulverize it, and prepare it for the scraper 16. The scraper 16 is suitably secured to threaded shafts 17 which pass through threaded parts 18 of the U-shaped yoke 3, that connects the rails 14 of the front section 1, to the rails 20 of the rear section 2, of the machine. The upper ends of the shafts 17 are provided with cranks 21 by which the scraper may be raised or lowered, as desired by turning the cranks to the right or left, owing to whether it is desired to raise or lower the scraper.

The rear end of the machine is mounted on wheels 22 secured to the outer ends of a shaft 23 which is in turn secured to the rails 20 and 20$^a$ in a sliding box 24, and in a pivotally secured box 24$^a$ which admit of sufficient end play of the shaft to cause the rear end of the machine to follow the front end in rounding curves. The rear wheels are adjusted by a triangle 26, composed of bars 26$^a$ and 26$^b$, to the apex end of which are secured cords 27 and 27$^a$, that pass from where they are secured on the apex of the triangle over rollers 28 and thence forward to a suitable lever 29 having a segment gear 30 that engages with a rack 31 within which the segment fits and works, and when the lever is moved forward, it draws the tension on the cord 27 and when rotated backward draws the tension on the cord 27$^a$ so that the rear end of the machine is moved either in or out as desired.

32 represents a shaft suitably supported in bearings 33, in the upper ends of the elevated side rails 34 which are connected at their lower ends to the side rails 14 and 20. On the shaft 32 are secured two segments 35 over which are passed cords 35$^a$ that extend down and have their lower ends secured to the side rails 20 of the rear frame. The shaft 32 is also provided with a lever 36 to the outer end of which is attached a cord 37 that connects with a drum 38 on the upright standards 39 secured to the front frame work of the machine. The drum 38 has on its outer end a gear wheel 40 which engages with a worm screw 41 formed on the inner end of the shaft 42 which is provided with a handle 43 on its outer end, and when it is desired to elevate the machine at its center the shaft 40 is rotated to the right, which winds the cord 37 on the drum and to lower it the shaft is rotated to the left, which unwinds the cord.

To a cross rail 44 on the front end of the frame work of the machine is suitably mounted the operator's seat 45.

I claim as my invention—

1. In a leveling machine, the combination of a two part frame, means for connecting the parts, a roller supporting the front part of the frame means for supporting the rear part of the frame, a pulverizer, a scraper, and means for operating the scraper: substantially as and for the purpose set forth.

2. A leveling machine, having the front and rear sections of the frame adjustably connected at their inner ends, for raising and lowering the center of the machine, the front end of the machine being suitably supported on a roller and the rear end being mounted on wheels having suitable means of adjustment to vary their line of travel: substantially as and for the purpose set forth.

3. In a leveling machine, the combination of a two part frame, composed of a front and a rear section connected at their inner ends by a U-shaped yoke, a scraper supported within the yoke, a pulverizer secured to the front section of the frame of the machine, a roller for supporting the front end of the machine and movable wheels supporting the rear end of the machine: substantially as and for the purpose set forth.

4. In a race-track leveling machine, the combination of a two-part frame suitably hinged near its center, means for elevating and lowering the frame at its center, and the front end of machine supported on a roller, and the rear end mounted on wheels and means for adjusting the rear end of the machine: substantially as and for the purpose set forth.

5. In a race-track leveling machine, the combination of a two part frame suitably hinged near its center elevated side rails forming a support for a shaft provided with segments over which are passed cords that form a connection between the shaft and frame of the machine, a lever on the shaft, a cord connecting the lever with a drum on the front frame of the machine, means for operating the drum, for elevating and lowering the frame at its center, a triangle, a lever, cords or cable connecting the triangle and lever, and means for operating them to vary the line of travel of the rear wheels of the machine: substantially as and for the purpose set forth.

W. T. NEWPORT.

In presence of—
 D. F. SEDENTOP,
 WM. S. HART.